(12) United States Patent
Wang et al.

(10) Patent No.: US 8,242,622 B2
(45) Date of Patent: Aug. 14, 2012

(54) METHOD AND SYSTEM FOR COMMUNICATING OVER NEUTRAL POWER LINES

(75) Inventors: Fangxin Wang, Burnaby (CA); Sam Shi, Burnaby (CA); Peter Sobotka, West Vancouver (CA)

(73) Assignee: Corinex Communications Corporation, Vancouver (CA)

( * ) Notice: Subject to any disclaimer, the term of this patent is extended or adjusted under 35 U.S.C. 154(b) by 0 days.

(21) Appl. No.: 12/845,677

(22) Filed: Jul. 28, 2010

(65) Prior Publication Data

US 2011/0182334 A1    Jul. 28, 2011

Related U.S. Application Data

(63) Continuation of application No. 11/633,873, filed on Dec. 4, 2006, now abandoned.

(51) Int. Cl.
*H02J 3/00* (2006.01)

(52) U.S. Cl. ....................... 307/3; 340/310.12

(58) Field of Classification Search ............. 340/310.12; 307/3
See application file for complete search history.

(56) References Cited

U.S. PATENT DOCUMENTS

| 4,408,186 A | 10/1983 | Howell |
| 6,417,762 B1* | 7/2002 | Comer ........................ 375/260 |
| 2008/0063093 A1* | 3/2008 | Refaeli et al. ................ 375/258 |
| 2008/0129533 A1 | 6/2008 | Wang et al. |

FOREIGN PATENT DOCUMENTS

EP      0141673 A2    5/1985

OTHER PUBLICATIONS

Office action, dated Jan. 28, 2010, in U.S. Appl. No. 11/633,873.

* cited by examiner

*Primary Examiner* — Robert L. Deberadinis
(74) *Attorney, Agent, or Firm* — Nixon Peabody LLP

(57) ABSTRACT

A method and system for communicating over neutral power lines is provided wherein the neutral power line is isolated from the ground line and other connections, such as with transformers, by using a plurality of ferrites. The ferrites are positioned between the connections to the neutral line and the outputs of a BPL modem.

17 Claims, 4 Drawing Sheets

METHOD AND SYSTEM FOR COMMUNICATING OVER NEUTRAL POWER LINES

PRIORITY CLAIM

The present application is a continuation of co-pending U.S. patent application Ser. No. 11/633,873 filed Dec. 4, 2006, the contents of which are incorporated herein by reference in their entirety.

FIELD OF THE INVENTION

The invention relates to methods of communication over power lines, and more particularly to methods of communication using neutral power lines.

BACKGROUND OF THE INVENTION

A recent development in communications technology is the transmission of data along standard power lines, known as broadband over power lines (BPL) or power line communication. The use of power line communications poses a number of challenges, including that power lines are inherently a very noisy environment. Every time a device is activated or turned off, noise (a pop or click) is added to the power line. Energy-saving devices within a home may introduce noisy harmonics into a power line. Therefore a communications system using power lines must accommodate the natural signal disruptions present.

Nearly all large power grids transmit power at high voltages across cities or between cities and at medium voltages between and across neighborhoods, to reduce transmission losses, using step-down transformers to reduce the voltage when approaching the end user. As BPL signals cannot readily pass through transformers, repeaters are attached to the transformers. In the U.S., typically a small transformer is hung from a utility pole to service a small number of (for example, 1 to 10) houses or homes (in some cases, a single house or even only street lights may be serviced with a transformer). In Europe, a transformer will typically service a larger number of houses.

Another issue in BPL is signal strength and operating frequency. BPL systems are expected to use frequencies in the 1 to 35 MHz range, which is commonly used by licensed amateur radio operators, international shortwave broadcasters and other communication systems (military, aeronautical, etc.). Power lines are unshielded and act as transmitters for the signals they carry, and thus may disrupt the 1 to 35 MHz range for such communications purposes.

Attempts to deal with the above challenges include U.S. Pat. No. 6,452,482 to Cern. The '482 patent discloses a coupler for coupling a data signal to a conductor in a medium voltage power transmission cable.

U.S. Pat. No. 6,809,633 to Cern discloses a coupling broadband modem to power lines. The '633 patent discloses the use of couplers attached to neutral lines for loopback purposes in low voltage BPL communications.

U.S. Pat. No. 7,091,849 to Henry discloses a method and apparatus for reducing inbound interference in a broadband power line communication system that adjusts the phase or amplitude of one of first or second carrier signals.

U.S. Pat. No. 7,088,232 to Wetmore discloses a system and method for reducing radiation when distributing broadband communication systems over power lines.

FIG. 1 shows a traditional priori art communications system for power grids, with signal transmission occurring on MV and LV power lines, using couplers 118 and 120 to connect transmitter 112 and receiver 124, respectively, to the power lines, and being subjected to RF noise problems, safety concerns, and reliability/durability problems. Utility poles include three separate sections, one for distribution for medium voltage (MV) power, a utility space for low voltage (LV) power and a telecom space. Traditional BPL equipment for utility pole to utility pole transmission uses MV lines, and therefore relies on the MV distribution section of the utility pole. Utility companies often require a very lengthy approval process (for safety and reliability, durability, etc.) to ensure equipment placed in this section of the utility pole does not negatively affect power on the grid or cause safety problems.

SUMMARY OF THE INVENTION

The system and method according to the invention uses neutral power lines within a power distribution grid to send communication signals, and provides several advantages over the prior art. The use of neutral lines reduces safety concerns, as linemen will not have to interact with MV lines, which have the potential to injure or kill a person. The use of the neutral line also obviates the need for expensive coupling technologies and products used in prior art BPL communications (and which are also a common point of failure). The system and method according to the invention also provides faster commercial approval from power utility companies by reducing concerns relating to reliability, safety and durability, as well as providing shorter installation times. Using neutral lines for BPL communications also results in improved performance of the BPL communications because MV power lines are significantly noisier than neutral lines, as neutral lines have less equipment connected to them than do MV lines.

A communications system is provided, including a neutral line connected to a second line at a point; and first and second ferrites on the neutral line, positioned at opposite first and second sides of said point. The second line may be a ground line. A third ferrite may be on the ground line, positioned below the point. A modem, such as a BPL modem, may also be provided having a first output, a second output, and a modem ground line, the first output connected to the neutral line at the first side of the point outside the first ferrite. The second output of the modem may be connected to the neutral line at the second side of the point outside of the second ferrite, and the modem ground line may be connected to the ground line below the third ferrite.

A fourth ferrite may be positioned on the first side of the neutral line, between the point and the connection to the first output. A fifth ferrite may be positioned on the second side of the neutral line, between the point and the connection to the second output. A sixth ferrite may be positioned on the ground line, below the point and above the connection to the modem ground line.

A communications system is provided for communicating messages from a first utility pole to a second utility pole, the first and second utility poles connected by a MV line and a neutral line, the neutral line connected to a ground line at the first utility pole, the neutral line isolated from the ground line, wherein the messages are communicated over the neutral line. The neutral line may be isolated using a plurality of ferrites, and a BPL modem may be used to communicate messages over the neutral line. The modem may be connected to the neutral line outside of the plurality of ferrites.

A method of isolating a neutral line for communicating messages thereon is provided, the neutral line connected to a second line at a point, including positioning a first ferrite on a first side of said point, and a second ferrite on a second side of said point. The second line may be a ground line. The method may include placing a third ferrite on the ground line, below the point.

The method may further include connecting a modem having a modem ground line and first and second outputs to the neutral line, the first output connected to the first side of the neutral line outside of the first ferrite, the second output connected to the second side of the neutral line outside of the second ferrite; and the modem ground line connected to the ground line below the third ferrite.

DETAILED DESCRIPTION OF THE INVENTION

The term "line" as used in this document refers to power lines or telecommunications lines, and may refer to a single line or wire, or a bundle of lines or wires. For example the term neutral line may refer to a single neutral wire, or a bundle of neutral wires.

The system and method according to the invention allow signals to be transmitted over neutral lines present on a typical power distribution grid provided by power utility companies. These signals can be transmitted both between utility poles, and from utility poles to a home or building, and through both MV and LV transformers.

Figure 1:
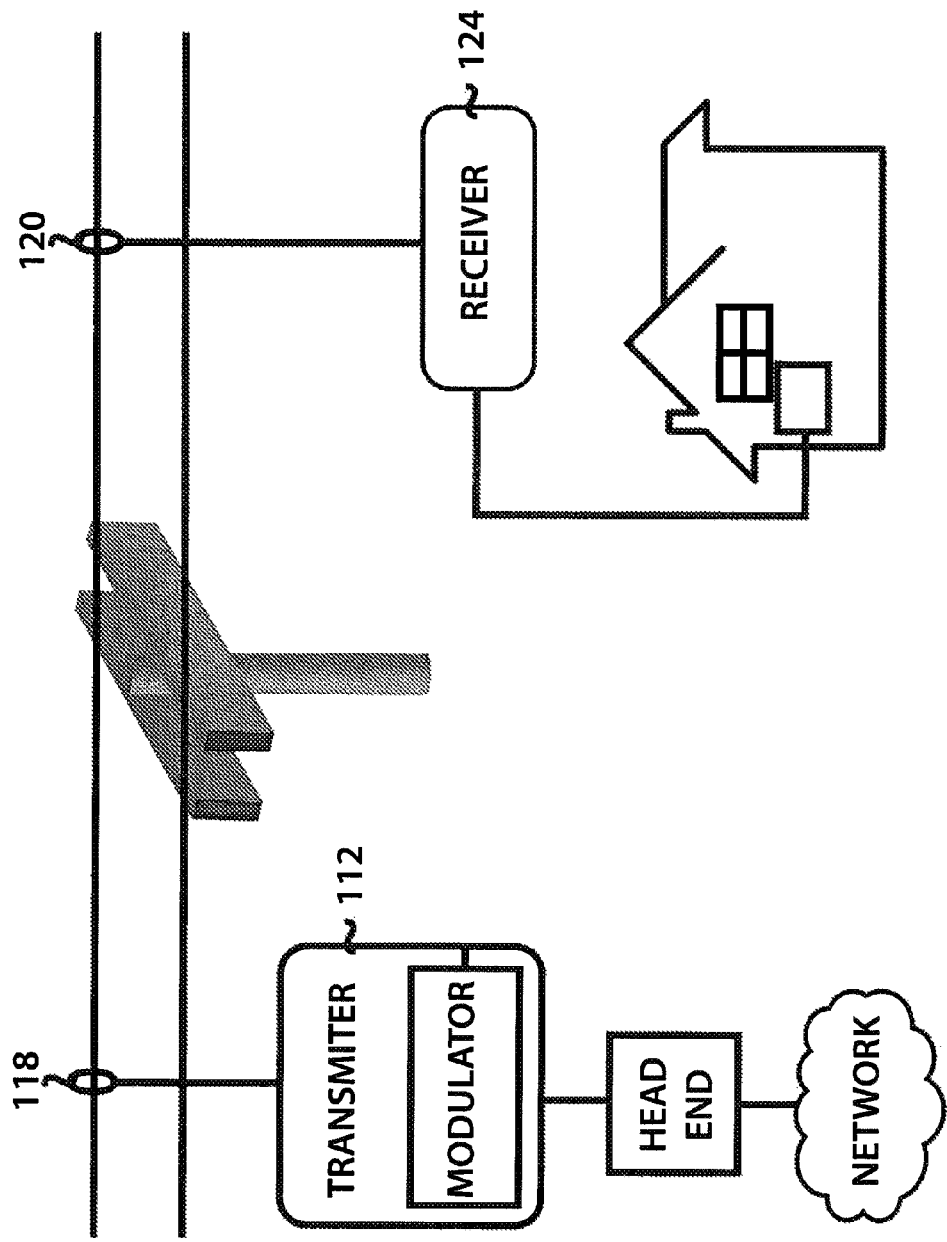
FIG. 1 is a view of a prior art BPL communication system.
Figure 2:
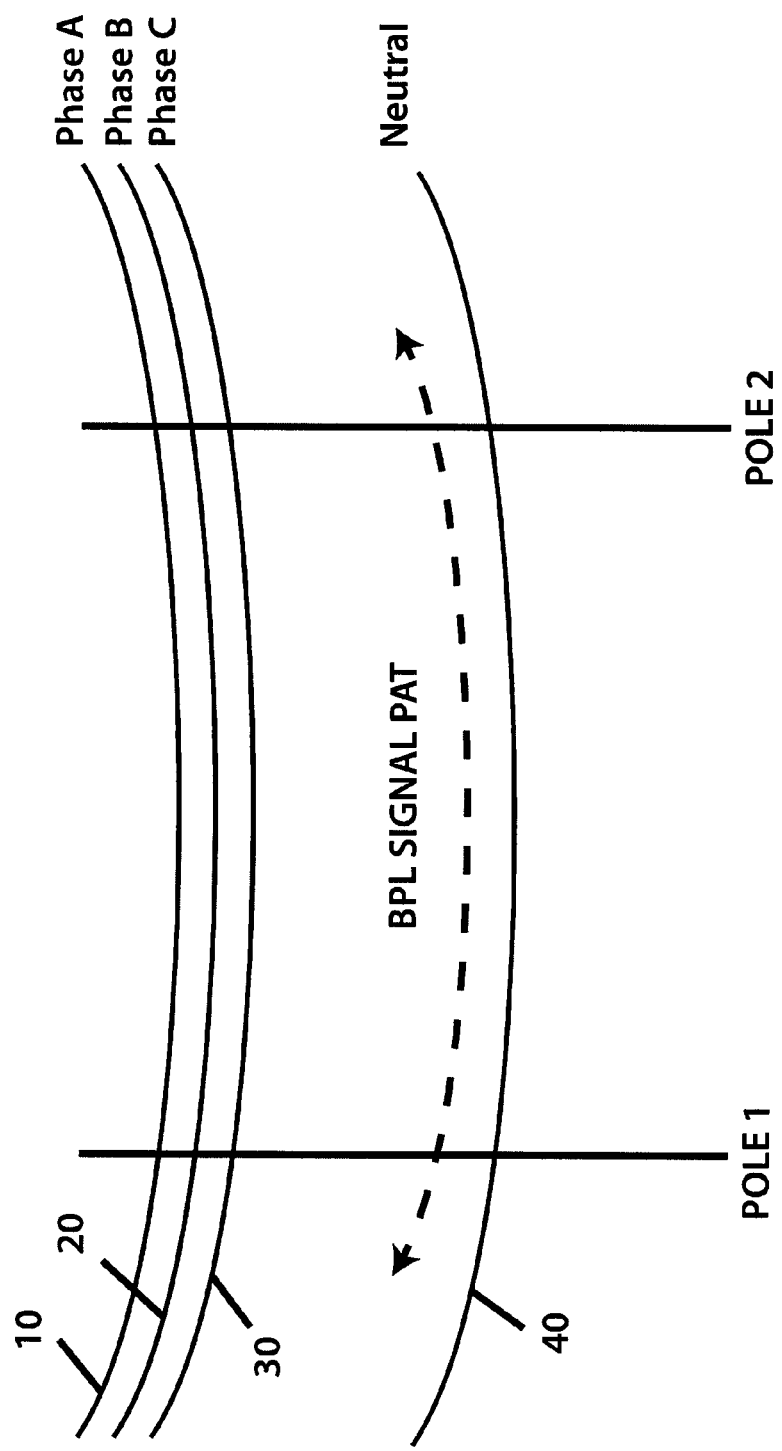
FIG. 2 is a view of a utility pole to utility pole transmission according to the invention.

As seen in FIG. 2, BPL signals are used to communicate between utility pole POLE1 and utility pole POLE2. MV electrical lines 10, 20 and 30 and neutral line 40 are strung between utility poles POLE1 and POLE2. According to the invention, BPL signals will be communicated over neutral line 40, whereas prior art BPL communications were communicated over MV lines 10, 20 and/or 30, in Phase A, Phase B, or Phase C, respectively, at 4 to 66 kV.

Figure 3:
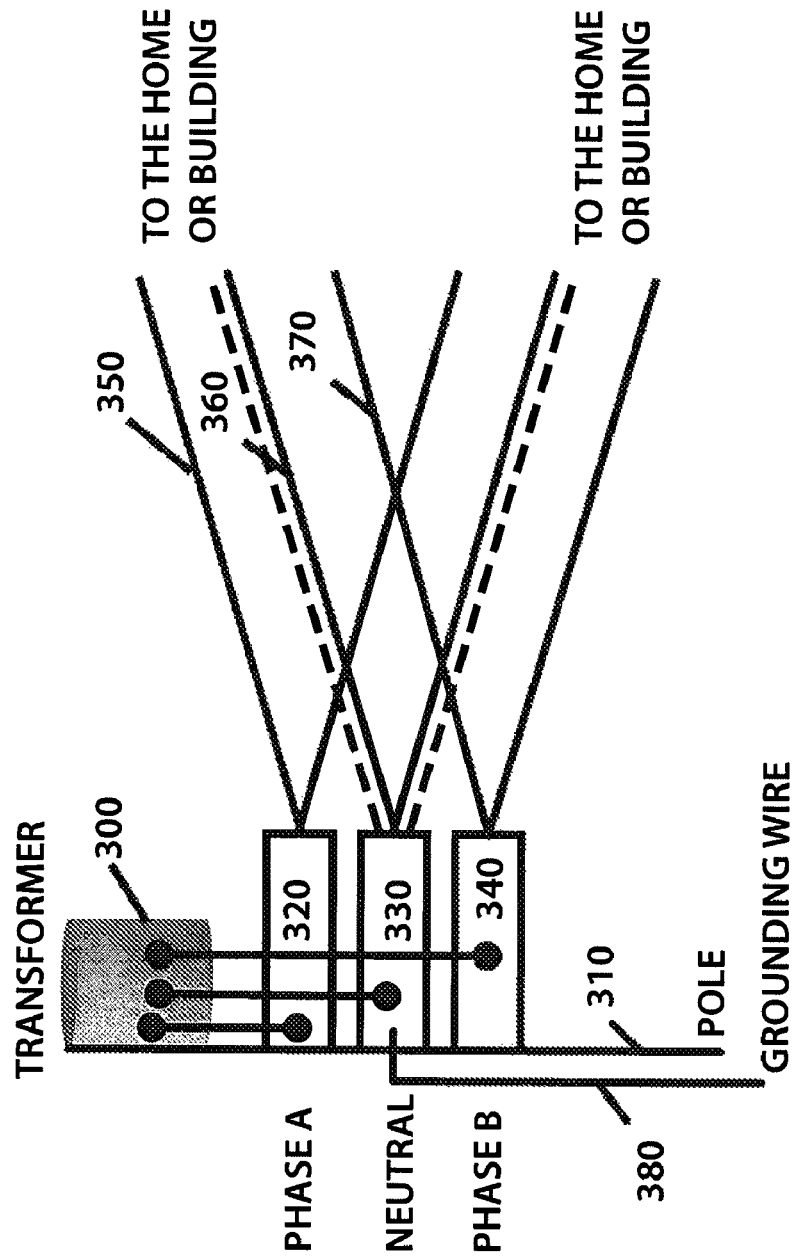
FIG. 3 is a view of power lines running from a utility pole to a building.

With reference to FIG. 3, in a typical connection from a utility pole to a home or building, MV/LV transformer 300 is secured to utility pole 310. Electrical harness, such as bus bars 320, 330, and 340 respectively connect LV line 350, neutral line 360 and LV line 370 from transformer 300 to a building. Many areas do not use bus bars for wire connections, and instead use other means of physically attaching power lines, such as directly joining the wires and/or taping the wires together. Ground line 380 connects neutral line 360 through bus bar 330 to the ground. Transformer 300 may have multiple ground connections (which may vary depending on local power regulations, customs, etc.). A step down transformer, such as transformer 300 usually has at least one ground line and one natural line. As seen in FIG. 3, ground line 380 is the line connected to the middle output connector of transformer 300, and is designed to be used for neutral lines. Some jurisdictions connect the pole's ground and neutral lines, and therefore neutral line 360 indirectly connects to the ground.

According to the invention, communications are transmitted over neutral line 360 (denoted by the dashed line), whereas in the prior art BPL signal transmission occurs over Phase A, and/or Phase B using LV lines 350 and 370, at 110 or 220 V.

To use BPL communications over neutral lines, the neutral line must be isolated from the ground line. Ferrites, electrically non-conductive ferrimagnetic ceramic compounds, are a useful tool for accomplishing this. The ferrites serve two primary purposes. The first purpose is to increase the isolation between the ground line and neutral line to prevent high frequency leakage, and still provide a pass-through for low frequency AC power, such as the 60 hz AC used in the U.S. The second purpose is to partition a connected neutral line into two segments by increasing the line's high frequency isolation. In general, the more ferrites used, the more isolated the subject neutral line is. This isolation helps prevent noise, such as the transformer noise or ground noise from being injected into the neutral line, thereby reducing the noise of the neutral wire and making it more suitable for BPL transmission. If a utility pole does not have a ground line, ferrites are not needed for the first purpose. Also, in some jurisdictions, not all neutral lines between utility pole segments are connected, in which case ferrites are not needed for the second purpose, as the neutral line is already isolated in this case.

In general, ferrites should be positioned as follows: A first set of ferrites should be positioned on the neutral line on a first or "left" side of the neutral line outside of all connections to the neutral line at the utility pole. Such connections may include a ground line, connections from a transformer (such as the transformer neutral line, transformer casing ground line, or transformer actual ground line), a street light, a telecommunications neutral line, or others. These connections do not include connections to a BPL modem (as described below). A "set" of ferrites refers to one or more ferrites. A second set of ferrites should be placed on the second, opposite, or "right" side of the utility pole, also outside of all connections to the neutral line at the utility pole. A third set of ferrites are placed on the ground line, below all connections on the ground line. The term "below" does not require the ferrites be physically below the connections, but are between the actual destination of the ground line (the ground) and the connections. The first and second outputs from a BPL modem are then placed as follows, the first output is connected to the first side of the neutral line outside of the first set of ferrite(s), and is connected to the ground line below the ferrite(s) on the ground line, and the second output is connected to the second, opposite side of the neutral line outside of the second set of ferrite(s) and below the ferrite(s) on the ground line.

Figure 4:
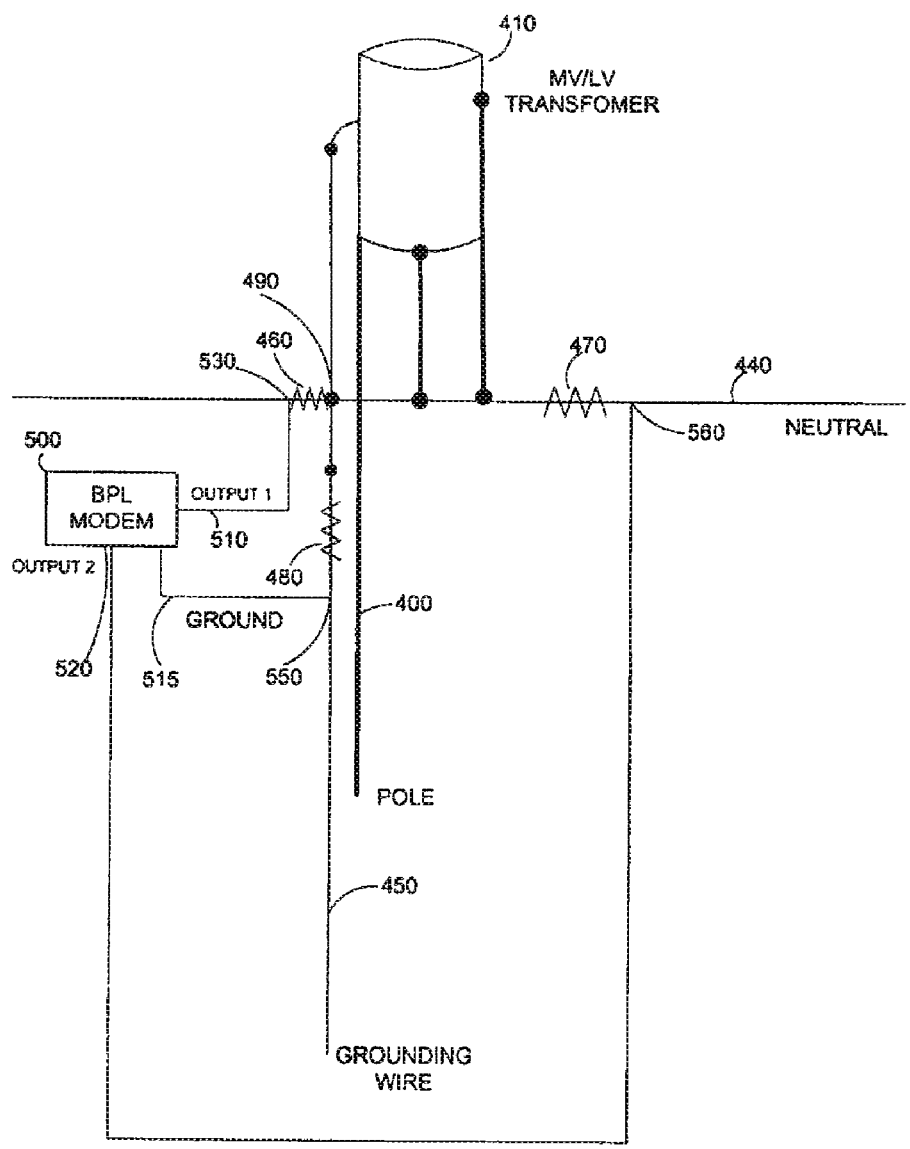
FIG. 4 is a view of a utility pole and connections to a building according to the invention.

FIG. 4 shows a representation of an isolated neutral line for use in BPL communications according to the invention. Transformer 410 is positioned on utility pole 400. Neutral line 440 extends between pole 400 and the home or building, as well as to the adjacent utility pole. Ground line 450 extends from neutral line 440 to the ground. Ferrites 460 and 470 are placed on neutral line 440 on either side, respectively, of neutral line 440's connection 490 to ground line 450. Ferrite 480 is positioned on ground line 450 below connection 490. Ferrites 460, 470 and 480 are all positioned proximate to connection point 490 between neutral line 440 and ground line 450 (in general, it is easier to install the ferrites the closer they are to connection point 490).

First output 510 of BOL modem 500, meets neutral line 440 outside of ferrite 460 at connection point 530. Second output 520 of the BPL modem 500 (which also may function as a repeater) is connected to neutral line 440 at connection point 560, outside of ferrite 470. Modem neutral line 515 connects to ground line 450 at point 550, below ferrite 480. The term "outside" as used in this document means located at a point along a line farther from the connection, point or pole than the object or point referred to. For example, point 530 is "outside" of ferrite 460 as point 530 is farther from connection 490 than is ferrite 460.

FIG. 4 is representative of a possible layout of a utility pole, but many variations exist in which other connections to neutral line 440 or ground line 450 may be present, as previously described.

In general, the more ferrites that are used the greater the isolation of the neutral line, and the less noise on the line (and less leakage). Research and testing have demonstrated that about five or six ferrites are most efficient (provide the greatest marginal change in isolation), and provide about 3 db leakage in signal transmission, although the type of ferrite used and the height of the utility pole may provide different optimal numbers. The ferrites, magnetic cores that clamp on a line, may be standard products, available at a minimal cost. The ferrites can be fastened to the line using conventional materials such as tape, a plastic fitting or a controlled grip with a screw.

When used in a communications network, ferrites should be positioned as necessary at utility poles to maintain signal strength (typically, every five poles, although more or less may be necessary depending on noise levels). A utility pole not connected to a ground or transformer will not need ferrites to maintain signal strength. The effect of using the ferrites is to create a "segment" through which the BPL communications can be transmitted, following which another "segment" should be created using the ferrites.

Although the particular preferred embodiments of the invention have been disclosed in detail for illustrative purposes, it will be recognized that variations or modifications of the disclosed apparatus lie within the scope of the present invention.

What is claimed is:

1. A communications system comprising:
   a. a neutral line connected to a second line at a point; and
   b. first and second ferrites on said neutral line, positioned at opposite first and second sides of said point.

2. The communications system of claim 1 wherein said second line is a ground line.

3. The communications system of claim 2 further comprising a third ferrite on said ground line, said third ferrite positioned below said point.

4. The communications system of claim 3 further comprising a modem, said modem having a first output and a second output and a modem ground line, said first output connected to said neutral line at said first side of said point outside said first ferrite and said modem ground line connected to said ground line below said third ferrite.

5. The communications system of claim 4 wherein said second output of said modem is connected to said neutral line at said second side of said point outside of said second ferrite.

6. The communications system of claim 5 wherein said modem is a BPL modem.

7. The communications system of claim 6 further comprising a fourth ferrite, said fourth ferrite positioned on said first side of said neutral line, between said point and said connection to said first output.

8. The communications system of claim 7 further comprising a fifth ferrite, said fifth ferrite positioned on said second side of said neutral line, between said point and said connection to said second output.

9. The communications system of claim 8 further comprising a sixth ferrite, said sixth ferrite positioned on said ground line, below said point and above said connection to said modem ground line.

10. A communications system for communicating messages from a first utility pole to a second utility pole, said first and second utility poles connected by a MV line and a neutral line, said neutral line connected to a ground line at said first utility pole, said neutral line isolated from said ground line, wherein said messages are communicated over said neutral line.

11. The communication system of claim 10 wherein said neutral line is isolated using a plurality of ferrites.

12. The communications system of claim 11 wherein a BPL modem is used to communicate messages over said neutral line.

13. The communications system of claim 12 wherein said modem is connected to said neutral line outside of said plurality of ferrites.

14. A method of isolating a neutral line for communicating messages thereon, said neutral line connected to a second line at a point, comprising positioning a first ferrite on a first side of said point, and a second ferrite on a second side of said point.

15. The method of claim 14 wherein said second line is a ground line.

16. The method of claim 15 further comprising placing a third ferrite on said ground line, below said point.

17. The method of claim 16 further comprising connecting a modem having first and second outputs to said neutral line, and a modem ground line to said ground line, said first output connected to said first side of said neutral line outside of said first ferrite; said second output connected to said second side of said neutral line outside of said second ferrite and said modem ground connected to said ground line below said third ferrite.

* * * * *